Nov. 12, 1935.   C. E. SORENSEN   2,020,439
BORING MACHINE
Filed Aug. 15, 1932   3 Sheets-Sheet 2

INVENTOR.
C. E. Sorensen.
BY
ATTORNEY.

Nov. 12, 1935.   C. E. SORENSEN   2,020,439
BORING MACHINE
Filed Aug. 15, 1932   3 Sheets-Sheet 3

INVENTOR.
C. E. Sorensen.
BY
ATTORNEY.

Patented Nov. 12, 1935

2,020,439

UNITED STATES PATENT OFFICE 2,020,439

BORING MACHINE

Charles E. Sorensen, Detroit, Mich., assignor to Ford Motor Company, Dearborn, Mich., a corporation of Delaware Application August 15, 1932, Serial No. 628,858

10 Claims. (Cl. 77—63)

The object of my invention is to provide a boring machine especially suitable for boring the cylinders of internal-combustion engines whereby truly cylindrical and exactly parallel bores are obtained. The machine shown herein is designed to bore a row of four cylinders in one operation and is equipped with an oscillating carriage whereby a V-type eight-cylinder motor may be bored by first boring one row of cylinders and then oscillating the carriage through the included angle between the rows of cylinders and then boring the other row. It should be kept in mind, however, that an important feature of this device is the means whereby each cylinder is machined exactly cylindrical and perpendicular to the motor crankshaft and that, incorporating this feature, a machine can readily be designed which will bore cylinder blocks having any number of cylinder bores therein.

The advantage of this machine is apparent for the reason that in internal-combustion engine construction all of the cylinder bores must be exactly perpendicular to the crankshaft of the engine. A slight deviation from the perpendicular of any cylinder relative to the crankshaft will cause excessive pressure on one side of the connecting rod bearing, this excessive pressure destroying the oil film and thus causing the bearing to prematurely fail. The primary purpose of this machine is therefore to machine a cylinder exactly perpendicular to the engine crankshaft within a degree of accuracy heretofore unattainable.

In order to accomplish this desirable result I have provided a row of boring bars and have arranged to pilot these boring bars from both above and beneath the cylinder block to thus maintain these bars in the exact parallel relationship. In this respect my machine differs from the conventional boring machine wherein the boring bars are piloted only at one end and cannot therefore be held in exact alignment. Ordinarily, it would not be deemed invention to simply provide two pilot bushings where one existed before. However, in this case, as will later be shown, the provision of two spaced pilots would not be workable without the invention as described herein.

With these and other objects in view my invention consists in the arrangement, construction and combination of the several parts comprising my improved device, as described in the specification, claimed in my claims and illustrated in the accompanying drawings, in which:

Figure 1:
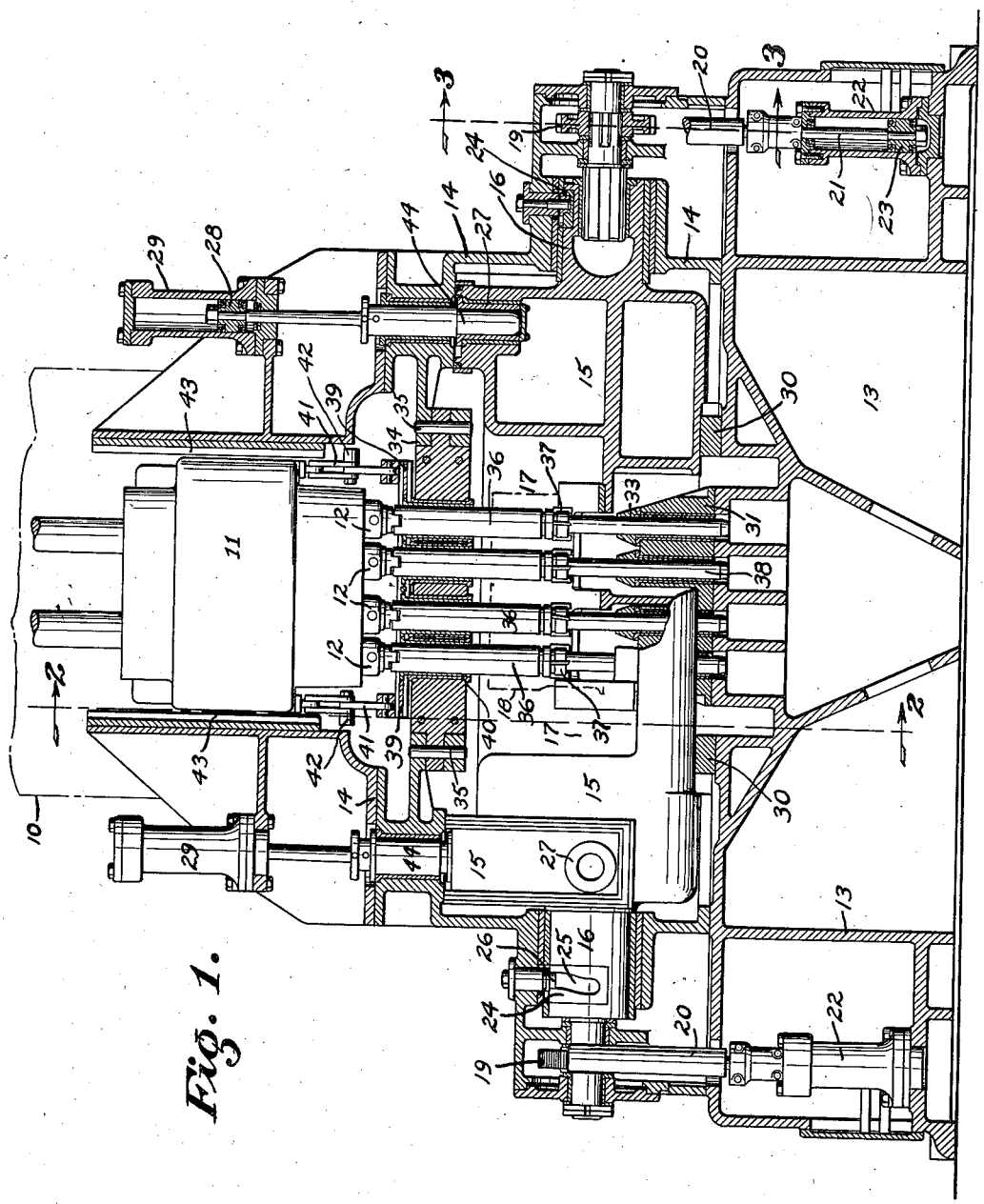
Figure 1 shows a vertical central sectional view through my improved boring machine, illustrating the construction and function of its various parts.

Before discussing the detailed construction of my device it may be well to mention that the novel portion thereof consists of a fixture which is adapted to be used in conjunction with most standard multiple spindle boring machines. I have shown such a boring machine by means of dotted lines 10, this machine having a boring head 11 reciprocally mounted thereon so as to reciprocate in a vertical direction up and down on the face of the machine. The head 11 is provided in this case with four spindles 12 rotatably mounted therein, each of which is driven by suitable gearing disposed within the head 11. The center distances between these spindles are spaced to coincide with the center distances between the several cylinders of the cylinder block being machined. It should be noted that my fixture does not guide the boring head 11 in its vertical path but rather is so mounted that the vertical movement of this head will actuate suitable boring bars located in my fixture.

Referring now to the fixture portion, this device consists of a base portion 13 upon which a body portion 14 is directly mounted, this body portion rotatably supporting a work carriage 15 therein. This carriage is primarily of cylindrical shape having a trunnion 16 at each end thereof, which trunnions are rotatably mounted in the body 14 so that the carriage 15 may oscillate through at least ninety degrees of movement.

Figure 2:
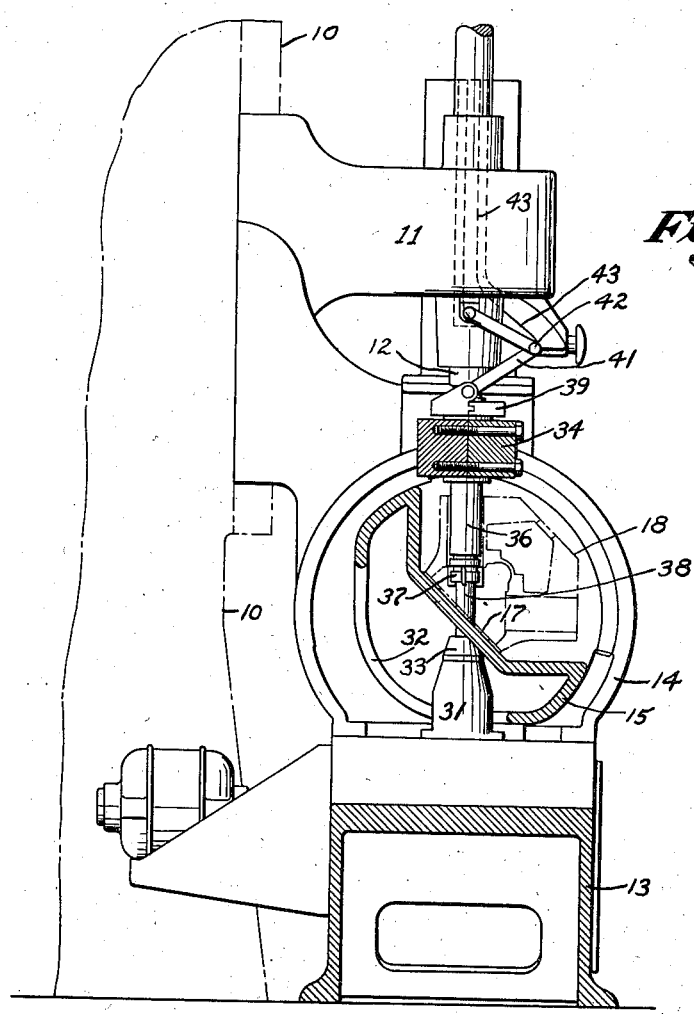
Figure 2 shows a sectional view, taken on the line 2—2 of Figure 1.
Figure 3:
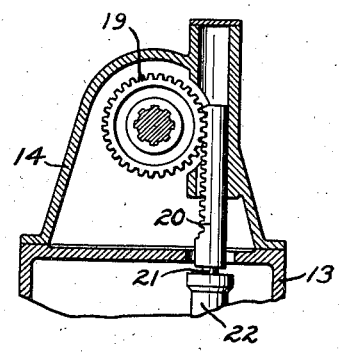
Figure 3 shows a sectional view, taken on the line 3—3 of Figure 1.

It will be noted from Figures 1 and 2 that the center portion of this carriage is recessed, as shown at 17, whereby an eight-cylinder V-type engine block, as shown by dotted lines 18, may be fixedly secured therein. Thus, when the carriage is in the position shown in Figure 2, one row of cylinders will be vertically aligned and when the carriage is rotated counter clockwise through ninety degrees from the position shown, then the other row of cylinders will be vertically aligned. Means are provided for oscillating this carriage, which consist of a pair of gears 19 each of which is non-rotatably splined to the outer end of one of the trunnions 16 and which gears mesh with a pair of racks 20. These racks are reciprocally mounted in the body portion 14, as shown in Figure 3, and the lower end of each rack is fixedly secured to a plunger 21 which plunger reciprocates in a cylinder 22 and is secured to a piston 23. Thus, when fluid under pressure is conducted either beneath or above the piston 23 then the pair of racks 20 will be simultaneously reciprocated, causing the gears 19 to rotate and thereby rotating the carriage 15. The travel of the piston 23 is so proportioned that the carriage 15 will be oscillated through substantially ninety degrees of movement.

Now, it so happens that many V-type engines are designed with the respective rows of cylinders offset longitudinally from each other so that the connecting rods of each pair of cylinders may lie side by side on the crank pin throw of the crankshaft, thereby elimininating the use of forked connecting rods. When such castings are to be machined, it is desirable to shift the whole carriage 15 longitudinally through the offset distance, which is usually about one inch, during the course of the movement from one position to the other. In order to accomplish this I have provided sector shaped cam inserts 24, placed one in each of the trunnions 16, each of which inserts has a cam groove 25 machined therein. A pair of cam follower rollers 26 are rotatably mounted in fixed positions in the body 14 and within the grooves 25 so that upon oscillation of the carriage 15 through ninety degrees, the cam grooves cause the trunnions 16 to move axially thereby moving the carriage through the desired offset movement.

It would be exceedingly difficult if not impossible to oscillate the carriage 15 through exactly ninety degrees by controlling the pistons 23 solely and consequently, a pair of relatively large dowel pins 44 are reciprocally mounted in each side of the body 14 in a vertical position, which dowel pins selectively coact with either of two pair of suitable dowel bushings 27 fixed in the carriage 15. When the carriage is in one of its extreme positions, the dowel pins are aligned with one pair of bushings and when the carriage is rotated to its other extreme position, the dowel pins become aligned with the other pair of bushings. These dowel pins are reciprocated by means of a pair of pistons 28 which are reciprocally mounted in a pair of cylinders 29. The cylinders 29 are mounted in a vertical position on the upper portion of the body 14 so that when fluid under pressure is conducted to the underside of the pistons, the dowel pins will be withdrawn or raised upwardly and inversely, when fluid is admitted to top of pistons, the dowel pins will be forced downwardly. The lower ends of these pins are rounded off so that slight misalignment of the bushings and dowel pins will not prevent the pins from slightly moving the carriage to its correct angular position. The two pairs of aligned bushings 27 are disposed at exactly ninety degrees to each other so that the exact positioning of the carriage in both of its extreme positions is assured. The pistons 28 and 23 are operated through manually operable valves whereby the pistons 23 first move the carriage to its extreme position and then the pistons 28 lock the device in this position.

The center portion of the carriage 15 is necessarily considerably weaker than the end portions thereof, due to the center being relieved to accommodate the casting being machined and to provide clearance for a plurality of piloting bushings beneath the carriage. This carriage is supported by the trunnions 16 only at its ends and to prevent bending due to the pressure of the boring tools, which will later be described, I have provided a pair of sector shaped tracks 30 secured to the base 13, one at each end of the relieved portion 17. Thus, a downward load applied on the center of the carriage will be resisted directly by the tracks 30 so as not to cause deflection of the carriage.

From the foregoing it will be seen that an eight-cylinder casting may be secured in the relieved portion 17 of the carriage 15 and that this carriage may then be oscillated to selectively align the cylinders therein with the spindles 12 of the boring head. Further, that this casting will be supported so as to resist an exceptionally great load, due to the tracks 30.

The boring bars and means for mounting will now be described, which description will bring out that these bars do not depend upon the head 11 for their alignment but rather are aligned by piloting bushings located in this fixture. A bracket 31 is fixedly secured on the upper face of the base 13 and projects up through an opening 32 formed in the lower portion of the carriage 15. In this case the bracket 31 is provided with four pilot sleeves 33 aligned with the spindles 12. Likewise, an upper bracket 34 is fixedly secured across the upper portion of the body 14 just above the carriage 15 by means of pins 35, this bracket having openings therethrough aligned with the sleeves 33. It will be noted that the plate 34 is spaced very closely to the upper edge of the carriage 15 and that each of the openings therein is aligned with one of the spindles 12 of the drilling head 11.

In order to accurately bore out the cylinders of the casting being machined, I have provided four boring bars 36 each having a cutter 37 fixedly secured to its intermediate portion and having one end thereof of reduced diameter, as shown at 38. The large end of each bar 36 is rotatably mounted in bushings 40 in the bracket 34 while the small ends of these bars are piloted in the sleeves 33. Thus, both ends of each of these four boring bars are supported independently of the spindles 12 so that four parallel bores in the cylinder block are readily obtained therewith. The large end of these bars is, however, connected to the lower end of the spindles 12 so as to be driven thereby and reciprocated thereby, although slight misalignment between the spindle and bar is permitted.

For reasons which will later be brought out the upper ends of the four bushings 40 are fixed to a bushing plate 39 so that upon raising the plate 39 the bushings 40 are drawn out of the bracket 34. The enlarged end or upper end of the boring bar is slightly smaller than the diameter of the cutter 37 so that this portion may enter and follow the cutter into the cylinder being machined without binding against the cylinder wall. The outer diameter of each of the bushings 40 is somewhat larger than the diameter of the cutters so that if these bushings 40 and the cutters are drawn upwardly out of the bracket 34, then the cutters will not interfere with the bracket. The reason for drawing the bars upwardly beyond the top of the cylinder block is to provide sufficient clearance so that the cylinder block may be removed from the fixture. This requires that the cutters 37 be drawn up through the bracket 34.

Heretofore it has been deemed impossible to pilot a cutting tool close to each end of the cylinder for the reason that the large end of the bar cannot be made quite as large as the diameter of the cutter and consequently, such cutter cannot be drawn through the bushing used to pilot the large end of the bar. Consequently, either of two alternatives were available. First, two bushings could be provided, one above and one below the cylinder, but in this case the bushing above had to be spaced above the cylinder a distance equal to the full length of the cylinder, plus the length of the cutter and plus the length of the lower piloting bushing. With engine cylinders ten to fifteen inches long, this required that the upper pilot bushing be spaced at least from twenty to thirty inches above the casting. A pilot located at such a distance is not effective in supporting the boring bar to obtain a required accuracy of .0005 of an inch, due to deflections in the bar itself.

The other method was to provide only one piloting bushing located above the cylinder and to make this bushing long enough to guide the cutter without a second bushing. Thus, the lower end of such bushing could be placed within a few inches of the cylinder. However, in this case the boring bar necessarily overhung the bushing the length of the cylinder when near the bottom of the cylinder, thereby producing deflections in the bar and causing errors.

The important feature of this device is that both the upper and lower piloting bushings are located very close to the ends of the cylinders so as to pilot the bar from both ends and thus minimize the deflection of the bar when operating.

In operation, the bushing plate 39 is drawn upwardly just ahead of the cutters 37 thereby providing clearance. This raising of the plate is accomplished by the movement of the head 11 through suitable toggle linkage. Each end of the plate 39 is pivotally connected to the lower end of a pair of toggle links 41 the upper end of each set of these links being pivotally secured to each side of the head 11. The center pivot of each of these toggle links is provided with a roller 42 which rollers are adapted to operate in a pair of grooves 43, these grooves being machined in the sides of the adjacent portion of the body 14.

Figure 4:
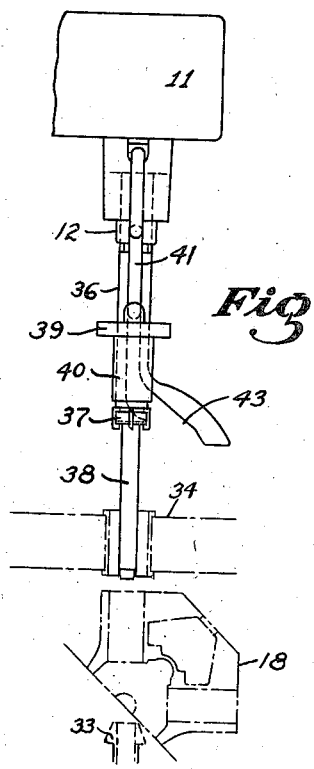
Figure 4 shows a diagrammatic view, illustrating the position of the boring bar and associated parts when the bar is raised to a position wherein the cylinder block may be removed from the machine.

Referring now to Figure 4, the head 11 is shown in its uppermost position wherein the cylinder block may be inserted in position to be bored. The action of only one bar will be described, the other three bars being operated in the same manner. It will be noted that when the bar is in the position shown in Figure 4, the toggle links are drawn out to their fully extended position thereby allowing the plate 39 and bushing 40 to be located adjacent to the cutters 37. Now when the head 11 is lowered the reduced portion 38 of boring bar lowers down through the cylinder opening. The end of the portion 38 enters the sleeve 33 just after the cutter 37 has entered into the opening in the bracket 34. The bushing 40 at this time is adjacent of the cutter 37 so that it follows the cutter into the opening in this bracket. By the time the cutter 37 reaches the position wherein it starts to machine away the walls of the cylinder, the plate 39 has been positioned down against the upper face of the bracket 34 and the lower end of the reduced portion 38 of the boring bar has entered the pilot sleeve 33. Thus, both the upper and lower ends of the bar are piloted at the beginning of the machining operation.

Figure 5:
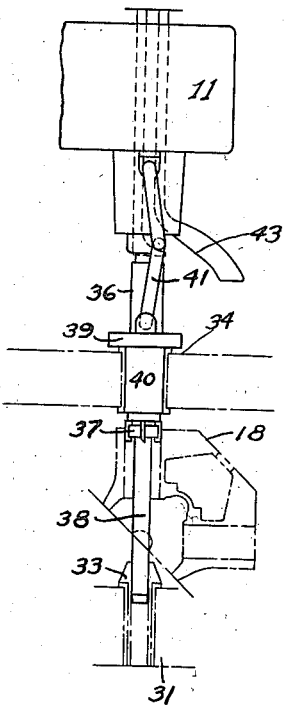
Figure 5 shows a diagrammatic view, somewhat similar to Figure 4, illustrating the position of the several parts after the boring bar has been moved to position wherein the machining action is begun.

It will be noted from Figure 5, which shows the position of the various elements at the starting of the machining cycle, that the toggle links 41 are not quite aligned with each other, the reason being that the lower end of the groove 43 is not vertical but rather curves to one side so that, just prior to plate 39 seating on the bracket 34, the center portion of the toggle link is pushed somewhat to one side to thereby insure that the links do not stop on dead center. Consequently, upon the continued downward movement of the head 11 to the position shown in Figure 6 wherein the cutting tool has advanced the entire length of the cylinder head, the toggle links are moved laterally through a considerable movement to thus allow the plate 39 to rest upon the top of the bracket 34.

Figure 6:
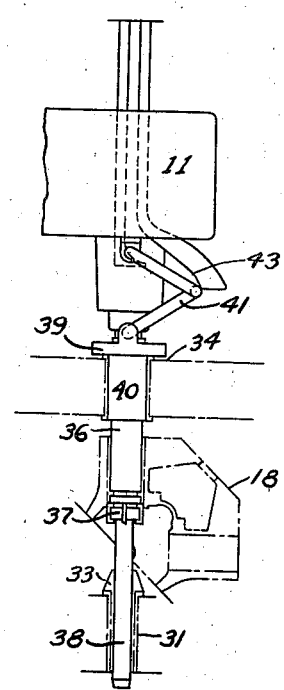
Figure 6 shows a diagrammatic view, similar to Figures 4 and 5, illustrating the position of the parts after the boring bar has advanced through the cylinder block.

Of course, upon the upward movement of the head from the position shown in Figure 6, the cutter 37 is first drawn upwardly through the cylinder bore until the toggle links 41 straighten out and then upon continued movement of the head upwardly, the bushings 40 are drawn out of their respective openings in the bracket 34 thereby allowing the cutters and reduced end portions of the boring bar to advance through the bracket 34. The carriage 15 may now be oscillated to position where the other cylinder block can be likewise machined without the lower end of the boring bars interfering with the casting.

The normal operation of the device is first to draw the head 11 up to its extreme upper position, as shown in Figure 4, then to clamp a cylinder block into the carriage 15 and cause the head 11 to quickly feed down to the position shown in Figure 5 and then slowly feed downwardly to the position shown in Figure 6 to thus bore the cylinders. The head is then raised up, the dowel pins 44 raised and the piston 23 operated to oscillate the carriage through ninety degrees and move it lengthwise through the longitudinal offset of the cylinder block. The pins 44 are then moved downwardly into the adjacent bushings and the head 11 again reciprocated to bore the remaining row of cylinders. The pins 44 are then again raised and the carriage moved back to its former position where the block is removed, a new one installed and the cycle repeated.

Among the many advantages arising from the use of this device, it may be well to mention that I have provided a boring fixture wherein the plurality of boring bars may be simultaneously fed down through a cylinder block each of which bars is piloted both above and beneath the cylinders and which pilots are located very close to the top and bottom of the cylinder to thereby accurately guide the boring tools. This operation cannot be accomplished with the conventional boring device and contributes greatly to the accuracy obtained with this fixture.

A further advantage arises because a V-type cylinder block may be accurately machined to limits hereto impossible of attainment with this type of casting.

Some changes may be made in the arrangement, construction and combination of the various parts of my improved device without departing from the spirit of my invention and it is my intention to cover by my claims such changes as may reasonably be included within the scope thereof.

I claim as my invention:

1. A cylinder boring machine comprising, a boring bar having a cutting tool located thereon intermediate of its ends, portions of the bar on each side of said tool being of somewhat smaller diameter than the cylinder machined by said tool, means for rotating and axially reciprocating said bar relative to the work to be machined, a bushing mounted on one end of said bar, the outer diameter of said bushing being larger than the cylinder machined by said tool, a pair of axially aligned piloting brackets disposed at the respective ends of the cylinder to be machined, one of said brackets accurately fitting said bushing and the other of said brackets accurately fitting the end of said bar opposite said bushing, and means for progressively moving said bushing into its piloting bracket and then moving said cutting tool through said cylinder so as to machine same.

2. A cylinder boring machine comprising, a boring bar having a cutting tool located thereon intermediate of its ends, a portion of the bar on one side of said tool being of slightly smaller diameter than the cylinder machined by said cutter, and that portion of the bar on the opposite end being of still smaller diameter, means for rotating and axially reciprocating said bar, a bushing rotatably mounted on the large end of said bar, the outer diameter of said bushing being larger than the cylinder machined by said cutter, a pair of brackets having axially aligned pilot openings therein disposed at the respective ends of the cylinders to be machined, one of said brackets closely fitting said bushing and the other of said brackets closely fitting the small end of said bar, and means for progressively moving said bushing into its piloting bracket and then moving said cutting tool through said cylinder so as to machine same.

3. A cylinder boring machine comprising, a boring bar having a cutting tool located thereon intermediate of its ends, a portion of the bar on each side of said cutter equivalent to the length of the cylinder to be machined being of somewhat smaller diameter than the cylinder machined by said tool, a vertical spindle mounted to rotate and reciprocate along a vertical axis, said spindle being connected to drive and reciprocate said bar, a bushing rotatably mounted on said bar between its driving end and said tool, the outer diameter of said bushing being somewhat larger than the cylinder machined by said tool, a pair of axially aligned piloting brackets disposed at the respective ends of the cylinder to be machined, the upper of said brackets closely fitting said bushing and the other of said brackets closely fitting the portion of the bar opposite said sleeve, means for progressively reciprocating said bushing into and out of its piloting bracket, and means for reciprocating said bar and tool into and out of said cylinder while said bushing is disposed within said bracket.

4. A cylinder boring machine comprising, a boring bar having a cutting tool fixed thereon intermediate of its ends, portions of the bar on each side of said tool being of smaller diameter than the cylinder machined by said tool, means for rotatably driving and axially reciprocating said bar, a bushing rotatably and reciprocally mounted on said bar, the outer diameter of said bushing being somewhat larger than the cylinder machined by said tool, and a pair of brackets having aligned pilot openings therein disposed at each end of the cylinder to be machined, one of said openings accurately fitting said bushing and the other accurately fitting the end of the bar opposite to said bushing, the means for reciprocating said bar being adapted to simultaneously reciprocate said bushing into and out of its coacting opening in said adjacent bracket, said bushing entering said bracket prior to the entering of the cutting tool in said cylinder, and said bushing being withdrawn from said bracket after the cutting tool has been withdrawn from said cylinder.

5. A device, as claimed in claim 4, wherein said bushing is reciprocated by a toggle link device, one end of which is secured to said bushing and the other end of which is secured to the boring bar reciprocating means.

6. A device, as claimed in claim 4, wherein a drilling head reciprocates and rotates said spindle, said drilling head being connected by a toggle link device to said bushing, for the purpose described.

7. A cylinder boring machine comprising, a frame, a boring bar having a cutting tool thereon rotatably mounted in said frame, means for rotating and axially reciprocating said bar relative to the work to be machined, a bushing slideably mounted on said bar between said cutting tool and said frame, the outer diameter of said bushing being larger than the cylinder machined by said tool, a bracket fixed to said frame in position adjacent to the work being bored, said bracket having an opening therein adapted to slideably receive said bushing, and a toggle link mechanism, one end of which is secured to said bushing and the other end of which is secured to said boring bar reciprocating means whereby said bushing and bar are simultaneously and positively reciprocated through said bracket during that portion of the machine cycle wherein the cutting tool is being fed towards said cylinder, the center portion of said toggle mechanism deflecting laterally when said cutting tool is being moved through said cylinder, for the purpose described.

8. A device, as claimed in claim 7, wherein mean are associated with said frame for laterally deflecting the intermediate portion of said toggle mechanism while said cutting tool is being fed through the work to be machined.

9. A cylinder boring machine comprising, a frame, a boring bar having a cutting tool located thereon intermediate of its ends, said bar being rotatably mounted upon said frame, means for rotating and axially reciprocating said bar relative to the work to be machined, a bushing slidably mounted upon said bar between said rotating means and said cutting tool, the outer diameter of said bushing being larger than the cylinder machined by said tool, a piloting bracket disposed between said rotating means and the work to be machined, said bracket having an opening therein accurately fitting said bushing, and a toggle link mechanism which progressively moves said bushing into said bracket opening and then moves said cutting tool through the cylinder which is being machined, one end of said toggle link being secured to the means for axially reciprocating said boring bar and the other end of said toggle mechanism being connected to said bushing and the intermediate joint of said toggle mechanism being guided by a groove formed in a stationary part of said machine.

10. A cylinder boring machine comprising, a frame, a boring bar having a cutting tool located thereon intermediate of its ends, said bar being rotatably mounted upon said frame, means for rotating and axially reciprocating said bar relative to the work to be machined, a bushing slidably mounted upon said bar between said rotating means and said cutting tool, the outer diameter of said bushing being larger than the cylinder machined by said tool, a piloting bracket disposed between said rotating means and the work to be machined, said bracket having an opening therein accurately fitting said bushing, and a toggle link mechanism which progressively moves said bushing into said bracket opening and then moves said cutting tool through the cylinder which is being machined, one end of said toggle mechanism being secured to said bushing and the other end of said mechanism being secured to said boring bar reciprocating means and the intermediate joint of said toggle mechanism being guided laterally by a groove formed in said frame.

CHARLES E. SORENSEN.